G. STEFFAN.
STONE DIGGING AND COLLECTING MACHINE.
APPLICATION FILED JULY 31, 1920.
1,380,936.
Patented June 7, 1921.
2 SHEETS—SHEET 1.
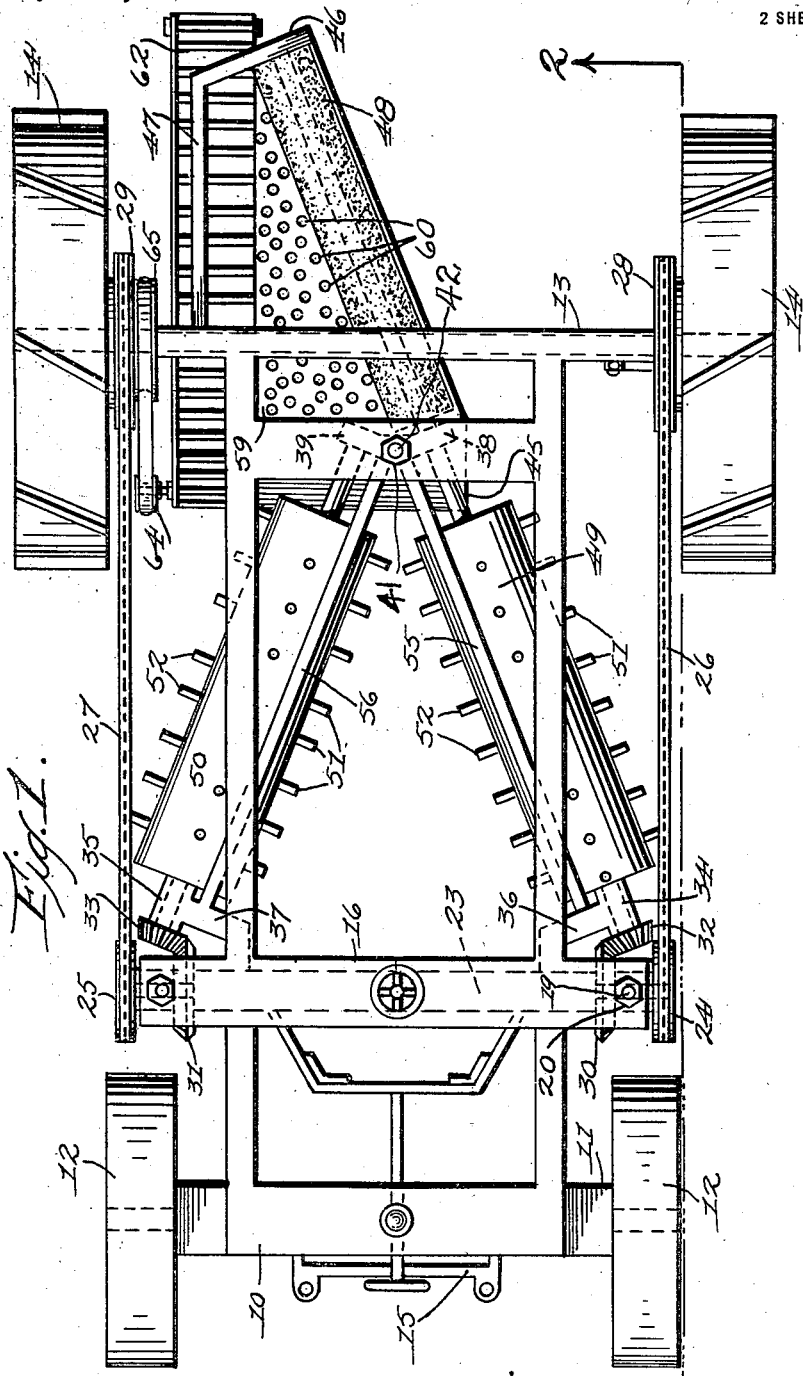
Inventor
George Steffan
By his Attorney
George C. Heinicke G. STEFFAN.
STONE DIGGING AND COLLECTING MACHINE.
APPLICATION FILED JULY 31, 1920.
1,380,936.
Patented June 7, 1921.
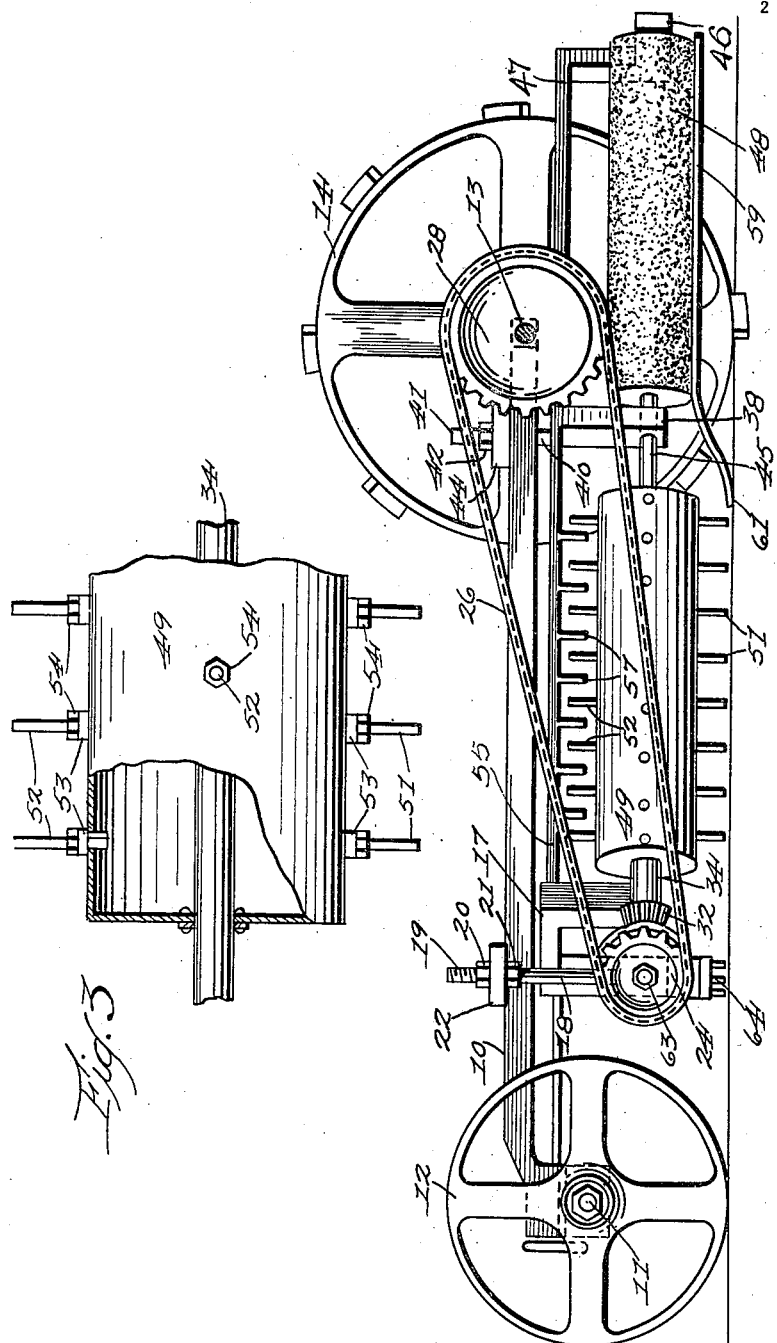

UNITED STATES PATENT OFFICE.

GEORGE STEFFAN, OF NEW YORK, N. Y.

STONE DIGGING AND COLLECTING MACHINE.

1,380,936.

Specification of Letters Patent.   Patented June 7, 1921.

Application filed July 31, 1920.   Serial No. 400,394.

*To all whom it may concern:*

Be it known that I, GEORGE STEFFAN, a citizen of Czechoslovakia, residing at New York, county of New York, and State of New York, have invented certain new and useful Improvements in Stone Digging and Collecting Machines, of which the following is a specification.

This invention relates to new and useful improvements in stone digging and collecting machines used for the clearing of land to be cultivated in an expeditious manner from stones or the like.

One of the objects of the invention is the provision of converging rollers provided with stone digging implements and in such position that the collected stones during the travel of the machine are delivered upon a platform in the rear of the rollers from where they are brushed onto a conveyer conveying the same to a collecting receptacle.

Another object of the invention is the provision of means for operating the machine during the travel of the same over the ground, and of means to elevate the digging implements above the ground when the machine is to be transported from one work place to another.

Still another object of the invention is the provision of a machine of this character which is simple in its construction, and which is provided with means to remove the earth adhering to the stones from the same before they are transferred onto the conveyer.

With the above and other objects in view, this invention resides in the novel features of construction, formations, combinations and arrangements of parts to be hereinafter more fully described, claimed and illustrated in the accompanying drawing, in which—

Figure 1 is a top plan view of a machine constructed according to the present invention.

Fig. 2 is a side view of the same, seen along line 2—2 of Fig. 1.

Fig. 3 is a detail side view partly in section of part of a stone digging roller.

The truck 10 carries the axle 11 for the front wheels 12 and the rear axle 13 for the rear tractor wheels 14 secured thereto in the usual well known manner.

To the front axle 11 a tree 15 is secured for the attachment of the draft animals. To a cross-beam 16 near the front end of the truck a bracket 17 is secured by means of an adjusting pin 18 provided at its upper end with a screw-thread 19 and locking nuts 20 and 21 at both sides of a block 22. The upper arm 23 of the bracket carries at its ends sprocket wheels 24 and 25 over which chains 26 and 27 are guided which are also guided over sprocket wheels 28 and 29 upon the rear axle 13. On the shafts of the sprocket wheels 24 and 25 bevel gears 30 and 31 are arranged which are in mesh with other bevel gears 32 and 33 upon the ends of shafts 34 and 35 rotatably mounted in the arms 36 and 37 of the bracket 17.

The other ends of the shafts 34 and 35, which converge toward the rear of the truck, are journaled in brackets 38 and 39, adjustably secured to the rear end of the truck by means of the rod 40 having an upper screw threaded end 41 and locking nuts 42 to both sides of a block 44. The rear end of the shaft 34 is extended as at 45 and the extreme outer end of the extension is journaled in an arm 46 of a bracket 47 secured to the truck. The extended end 45 carries a rotary brush 48 for a purpose to be more fully described hereinafter.

Shafts 34 and 35 carry hollow rollers 49 and 50 provided at opposite sides of their periphery with a plurality of digging implements 51 and 52 exchangeably secured to and in said rollers by means of blocks 53 and 54. Two guard pieces 55 and 56 are secured with one of their ends in the arms 36 and 37 and with their other ends to the brackets 38 and 39, however above the plane of the rollers. These guards are provided at their lower edges with a plurality of teeth 57, so that the diggers 51 and 52 respectively can pass through the spaces between two adjoining teeth.

The bracket 47 and its arms 46 carry a platform 59 provided with a plurality of openings 60, and the front end of the platform is shaped to form a shovel as indicated at 61.

This platform is arranged above a conveyer 62 provided at the rear of the truck so that the stones can be wiped by the brush from the platform 59 onto the conveyer 62, while the soil loosened from the stones falls through the openings in the platform.

The bracket 17 is extended downwardly as at 63 to carry a rake 64 or the like to clear the ground in front of the machine from leaves, tree branches, etc.

The conveyer 62 is operated by a pulley and belt connection 64 from a pulley 65 secured to the rear axle 13.

When it is desired to clear a piece of land from stones, the rake and the rollers carrying the diggers are lowered to the necessary distance above the ground by means of the adjusting rods 18, 40, and locked in their adjusted positions by means of the nuts and blocks, and when then the machine is moved forward over the ground, the converging rollers will rotate and the diggers will pick up all stones in their way and throw the same into the middle so that during the forward travel of the machine they will come onto the platform 59 from where they are brushed by means of the brush 48 onto the conveyer, to be carried to suitable collecting receptacles.

It will be clear, that changes may be made in the general arrangement of the parts and in the construction of the minor details of my machine without departing from the scope and spirit of my invention, however what I claim as new and desire to secure by Letters Patent of the United States, is—

1. A machine of the character described comprising a wheeled truck, converging rollers adapted to rotate during the travel of the truck over the ground, stone digging means on said rollers, a stone collecting platform in rear of said truck, a conveyer and a means for brushing the stones dug by said digging means onto said conveyer after they have been freed of the adhering soil.

2. A machine of the character described, comprising a wheeled truck, converging rollers suspended from said truck, means for transmitting the rotation of the rear wheels of said truck to said rollers during the travel of the truck over the ground, stone digging implements exchangeably secured upon each of said rollers, guards coöperating with said digging implements during the rotation of said rollers, a collecting platform at the rear of the truck, a conveyer below said platform and means for brushing the stones dug from the ground by said digging implements onto said conveyer and freeing the same from the adhering soil.

3. In a machine of the character described, a wheeled truck, means for attaching draft animals to said truck, brackets below said truck carrying sprocket wheels, sprocket wheels upon the rear axle of the truck and chains guided over both sets of sprocket wheels to transmit the rotation of the rear axle of the truck to said first named sprocket wheels, bevel gears adapted to be rotated upon the rotation of said sprocket wheels, converging shafts, bevel gears on said shafts in mesh with said first named bevel gears, stone digging rollers on said shafts and an extension of one of said shafts, a wiper roller on said extension, a perforated platform, below said wiper roller, a conveyer below said platform, and means for operating said conveyer from the rear axle of the truck.

4. In a machine of the character described, the combination of a four wheeled truck with stone digging and collecting means adapted to be operated upon the travel of said truck over the ground, means for attaching a draft animal to said truck, a rake in front of said digging and collecting means, means for adjusting said stone digging and collecting means to lower and raise the same for throwing said means out of operation during the travel of the truck from one work place to another, and to lower said means and lock the same in their lowered working position, a conveyer for receiving and conveying the stones, and means for operating said conveyer from the rear axle of the vehicle.

In testimony whereof I have affixed my signature.

GEORGE STEFFAN.